UNITED STATES PATENT OFFICE.

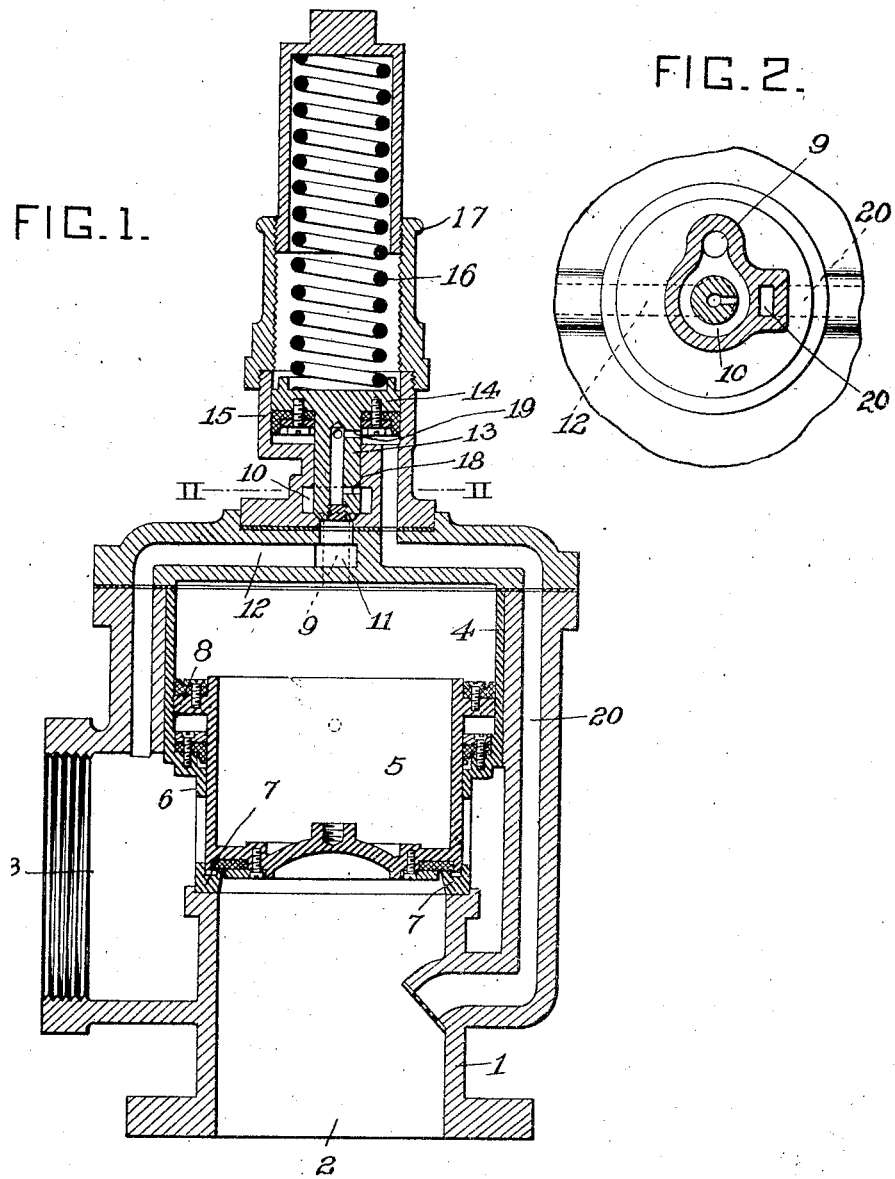

EDWARD V. ANDERSON, OF MONESSEN, PENNSYLVANIA, ASSIGNOR, BY DIRECT AND MESNE ASSIGNMENTS, TO GOLDEN-ANDERSON VALVE SPECIALTY COMPANY, OF PITTSBURG, PENNSYLVANIA, A CORPORATION OF PENNSYLVANIA.

RELIEF-VALVE.

No. 919,300.   Specification of Letters Patent.   Patented April 27, 1909.

Application filed January 7, 1909. Serial No. 471,110.

*To all whom it may concern:*

Be it known that I, EDWARD V. ANDERSON, residing at Monessen, in the county of Westmoreland and State of Pennsylvania, a citizen of the United States, have invented or discovered certain new and useful Improvements in Relief-Valves, of which improvements the following is a specification.

The invention described herein relates to certain improvements in relief valves for fluids under pressure, and has for its object a construction whereby when the fluid attains a certain predetermined pressure the valve is opened, and when such pressure returns to normal, by reason of the escape of fluid, will be automatically closed. The invention is hereinafter more fully described and claimed.

In the accompanying drawings forming a part of this specification, Figure 1 is a sectional elevation of my improved valve and Fig. 2 is a transverse section on the plane indicated by the line II—II Fig. 1.

In the practice of my invention the casing 1 is formed with an inlet port 2 and an outlet port 3 preferably arranged at right angles to each other, and is provided in the upper portion of the casing with a cylinder 4 for the reception of the hollow piston valve 5. The cylinder 4 is preferably formed by a lining inserted in the casing and provided with a tubular extension 6 having openings in its sides for the passage of fluid and an opening in its lower end adapted to be closed by the closed lower end of the piston. The extension 6 is provided around its end opening with a seat 7 for the valve formed by the lower end of the piston 5, which also closes the lateral ports in the extension of the cylinder. As shown the cylinder proper is made of a diameter somewhat greater than the extension 6 so as to permit of an enlargement in the form of a flange 8, at the upper end of the piston so that the area of the piston within the cylinder is greater than the area of its lower end which is subjected to the pressure entering through the inlet 2.

A port 9 is formed in the top of the cylinder for the passage of fluid into and out of the latter, said port communicating with a passage 10, which in turn is connected by a port 11 and passage 12 to the outlet 3 of the main valve. The port 11 is adapted to be closed by a valve 13 preferably formed by the end of the stem of the piston 14 arranged in a cylinder 15 carried by the top of the main valve. The valve 13 is yieldingly held to its seat by a spring 16 arranged in a tubular extension 17 of the cylinder 15, such extension being formed in two sections, one internally threaded and the other externally threaded to permit of the adjustment of the tension of the spring. The passage 10 surrounding the valve 13 is connected by a port 18 with an axial passage in the valve 13, which in turn is connected by a port 19 with the interior of the cylinder 15 below the piston. This portion of the cylinder is also connected by a by-pass 20 with the inlet port 2, such by-pass being preferably formed in the walls of the shell 1 and the cap of the shell as shown. So long as the pressure on the inlet side of the main valve is below normal, or that at which the valve 13 is set, fluid will flow through the by-pass 20 into the cylinder 15 and thence by the port 20, passage 19 and port 18 into the passage 10, and thence by the port 9 into the cylinder 4, thus holding the piston valve 5 tightly against its seat. As soon as the pressure on the inlet side of the main valve is increased beyond normal, the piston 14 will be raised, lifting the valve 13 from its seat and closing the port 18. The fluid in the cylinder 4 will then flow up through the port 9, passage 10, outlet port 11 and passage 12 into the outlet 3 of the main valve, so long as the pressure on the inlet side is above normal. As soon as the escape of the fluid through the outlet port is sufficient to relieve the excess pressure, the valve 13 by its spring 16 will be closed and fluid will then flow as before described into the cylinder 4, closing the main valve.

I claim herein as my invention:

A valve having in combination therewith a shell or case for the passage of fluid, a valve controlling such flow and seating against pressure, a cylinder, a piston arranged in said cylinder and connected to the valve, passages connecting the inlet and outlet of the shell or case with said cylinder, a valve controlling the flow of fluid to the cylinder, a spring controlled movable part or member subjected to inlet pressure and connected to the latter valve.

In testimony whereof I have hereunto set my hand.

EDWARD V. ANDERSON.

Witnesses:
CHARLES BARNETT,
EDWARD F. MOSER.